March 25, 1941.    G. CLARK    2,236,365

BULLNOSE CORNER GAUGE

Filed May 1, 1939

INVENTOR.
Gilbert Clark
BY A. B. Bowman
ATTORNEY.

Patented Mar. 25, 1941

2,236,365

UNITED STATES PATENT OFFICE 2,236,365

BULLNOSE CORNER GAUGE

Gilbert Clark, National City, Calif.

Application May 1, 1939, Serial No. 271,218

4 Claims. (Cl. 72—128)

My invention relates to a bullnose corner gauge for use in forming bullnose corners of plaster, cement or the like and the objects of my invention are:

First, to provide a bullnose corner gauge of this class which assures uniformity in the forming of bullnose corners;

Second, to provide a bullnose corner gauge of this class which will save time and effort in the forming of uniform bullnose corners;

Third, to provide a bullnose corner gauge of this class which is very easy to operate;

Fourth, to provide a bullnose corner gauge of this class with a variety of gauge members which will form bullnose corners of any desired radius or curve;

Fifth, to provide a bullnose corner gauge which is easy to adjust for making bullnose corners of various radii and curves;

Sixth, to provide a bullnose corner gauge of this class which is simple and compact, and Seventh, to provide a bullnose corner gauge of this class which is very simple and economical of construction, efficient in its action and which will not readily deteriorate or get out of order.

Figure 1:
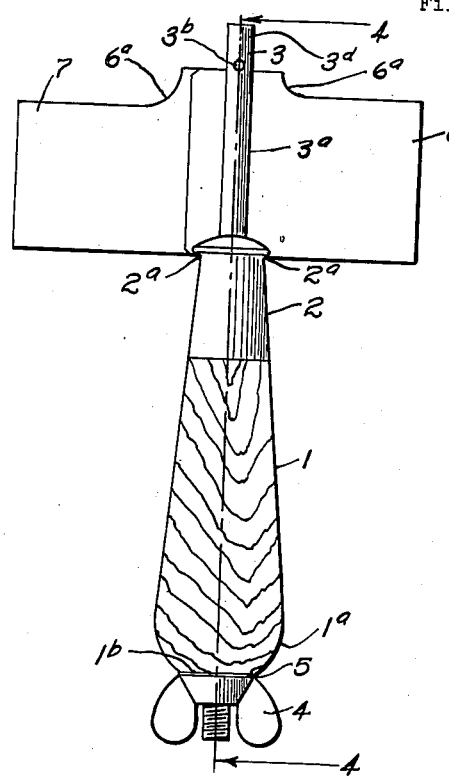
Figure 2:
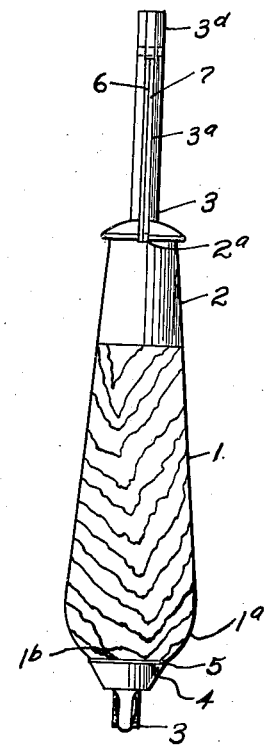
Figure 3:
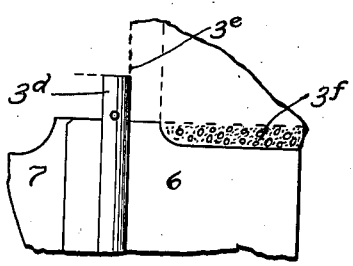
Figure 4:
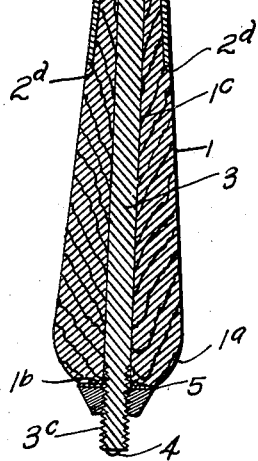

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a top or plan view of my bullnose corner gauge complete; Fig. 2 is an edge view of my bullnose corner gauge; Fig. 3 is a fragmentary top or plan view of my bullnose corner gauge showing by dash lines a window or door frame with which the gauge is used; and Fig. 4 is a longitudinal sectional view taken from the line 4—4 of Fig. 1.

Similar characters of reference refer to similar parts and portions throughout the several views of the drawing:

The handle member 1, handle member ferrule 2, clamping rod 3, wing nut 4, washer 5 and gauge members 6 and 7 constitute the principal parts of my bullnose corner gauge.

The handle member 1 is substantially four and one-half inches long, one inch in diameter and slightly tapered to the ferrule 2 which encircles the smaller end of the handle member 1. The handle member 1 may be made of wood or any other suitable material. The larger end of the handle member 1 is provided with an inwardly curving surface 1a. Adjacent said surface 1a, the handle member 1 is provided with a flat surface 1b and positioned thereon is a washer 5. The handle member 1 is provided with a bore 1c which extends the full length of said handle member 1. Positioned in the bore 1c is the clamping rod 3, as shown best in Figs. 1, 2 and 4 of the drawing. The smaller end of the handle member 1 is reduced at 2d to receive the handle member ferrule 2, as shown best in Figs. 1, 2 and 4 of the drawing. The handle member ferrule 2 is substantially dome shaped on its one end; and is slotted to afford clamping shoulders 2a against which the gauge members 6 and 7 are clamped by means of the clamping rod 3 and the wing nut 4. The clamping rod 3 is provided at its one end with a slot 3a in which the gauge members 6 and 7 are held. The clamping rod 3 is provided with a pin 3b which extends through said clamping rod 3 at the end of the slot 3a. The pin 3b is for the purpose of retaining the gauges 6 and 7 under the pressure of the shoulders 2a of the handle member ferrule 2. It will be noted that the slot 3a may be milled in the clamping rod 3 and the end portion 3d may remain unslotted. The upper end of the clamping rod 3 is provided with a threaded end portion 3c on which the wing nut 4 is screw threaded. The wing nut 4 is conventional. The washer 5 is for the purpose of engaging with the wing nut 4 as it is tightened against the flat surface 1b of the handle member 1. The gauge members 6 and 7 are placed side by side in the slot 3a of the clamping rod 3. Each gauge member is provided with a certain curve 6a which is used for making a certain shaped bullnose corner. It will be here noted that my bullnose corner gauge may include in its entirety several of said gauge members in various forms shown.

The operation of my bullnose corner gauge is substantially as follows: After fresh soft plaster, or other material has been applied to the foundation which may be the corner around a door, window or other structure, the portion 3d of the clamping rod 3 is placed against the framework 3e shown by dash lines, as shown best in Fig. 3 of the drawing. The fresh plaster, or other material 3f, is formed by the curved portion 6a of the gauge member 6. As the length of said framework is followed by the portion 3d of the clamping rod 3, the gauge member 6 in turn forms the plaster, or other material, into a bullnose corner the length of said framework. If it is desired to use the gauge for a different size or thickness of wall, the gauge may be turned one-half revolution and the other side used and a thinner or thicker plaster wall may be gauged. Furthermore the width from the inner side of the frame to the plaster may be adjusted by shifting the gauge members in the slot 3a by loosening the wing nut 4 and then after shifting tightening the same.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a bullnose corner gauge of the class described, the combination of a handle member provided with a central bore, a clamp rod shiftably mounted longitudinally therein provided with a slot arranged longitudinally in said rod at one end and threaded at its opposite end, a wing nut on said threaded end in engagement with one end of said handle, and a pair of bullnose gauge members positioned in overlapped relation to each other in said slot and extending in opposite directions.

2. In a bullnose corner gauge of the class described, the combination of a handle member provided with a central bore, a clamp rod shiftably mounted longitudinally therein provided with a slot arranged longitudinally in said rod at one end and threaded at its opposite end, a wing nut on said threaded end in engagement with one end of said handle, a pair of bullnose gauge members positioned in overlapped relation to each other in said slot and extending in opposite directions, and a ferrule on said handle provided with a slot in its outer end adapted to receive and support one edge of both of said gauge members.

3. In a bullnose corner gauge of the class described, the combination of a handle member, a clamping rod shiftably mounted therein provided with a slot arranged longitudinally thereof and said rod extending into said handle member and a flat plate bullnose gauge member provided with a reduced curved portion arranged in spaced relation from said rod with one end shiftably positioned in said slot and extending therefrom, the extended end of said rod forming a guide for said gauge.

4. In a bullnose corner gauge of the class described, the combination of a handle member, a clamping rod shiftably mounted therein provided with a slot arranged longitudinally thereof and said rod extending into said handle member, a flat plate bullnose gauge member provided with a reduced curved portion arranged in spaced relation from said rod with one end shiftably positioned in said slot and extending therefrom the extended end of said rod forming a guide for said gauge, means for clamping said gauge member between the end of said slot and said handle member, and a ferrule reinforcing said handle member at the gauge engaging end provided with a gauge receiving slot in its outer end.

GILBERT CLARK.